(12) United States Patent
Rowan et al.

(10) Patent No.: US 11,321,629 B1
(45) Date of Patent: May 3, 2022

(54) SYSTEM AND METHOD FOR LABELING MACHINE LEARNING INPUTS

(71) Applicant: Intuit Inc., Mountain View, CA (US)

(72) Inventors: Sean Rowan, San Diego, CA (US); Joseph Cessna, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 770 days.

(21) Appl. No.: 16/142,393

(22) Filed: Sep. 26, 2018

(51) Int. Cl.
*G06N 20/00* (2019.01)
*G06Q 40/00* (2012.01)

(52) U.S. Cl.
CPC ............. *G06N 20/00* (2019.01); *G06Q 40/10* (2013.01)

(58) Field of Classification Search
CPC ................................ G06N 20/00; G06Q 40/10
See application file for complete search history.

(56) References Cited

U.S. PATENT DOCUMENTS

| | | | | |
|---|---|---|---|---|
| 10,552,735 B1 * | 2/2020 | Widerhorn | ................ | G06N 3/08 |
| 2013/0254153 A1 * | 9/2013 | Marcheret | ................ | G06N 7/00 |
| | | | | 706/59 |
| 2016/0019282 A1 * | 1/2016 | Lewis | ................ | G06F 16/35 |
| | | | | 707/740 |
| 2017/0060993 A1 * | 3/2017 | Pendar | ................ | G06N 20/00 |
| 2017/0116519 A1 * | 4/2017 | Johnson | ................ | G06N 3/08 |
| 2018/0018740 A1 * | 1/2018 | Unsal | ................ | G06N 20/00 |
| 2018/0114142 A1 * | 4/2018 | Mueller | ................ | G06F 16/906 |
| 2018/0137433 A1 * | 5/2018 | Devarakonda | ......... | G16H 10/20 |
| 2019/0019061 A1 * | 1/2019 | Trenholm | ............... | G06N 20/00 |
| 2020/0210899 A1 * | 7/2020 | Guo | ................ | G06Q 10/0635 |

OTHER PUBLICATIONS

"Prodigy," [online], retrieved Sep. 24, 2018. Retrieved from the internet <URL: https://prodi.gy/>.
Rowan et al., "Method and System for Providing a Machine Learning Model Deployment Interface," U.S. Appl. No. 16/110,435, filed Aug. 23, 2018.

* cited by examiner

*Primary Examiner* — Florian M Zeender
*Assistant Examiner* — Christopher R Buchanan
(74) *Attorney, Agent, or Firm* — Paradice and Li LLP

(57) ABSTRACT

A method and system assists users to generate training sets of labeled data items for machine learning processes. The method and system receives data sets of unlabeled data items from users. The method and system presents data items from the data set for labeling by the users. The method and system analyzes data items that have been labeled by the user and selects future data items to be presented to the user based on analysis of the labeled data items.

29 Claims, 4 Drawing Sheets

SYSTEM AND METHOD FOR LABELING MACHINE LEARNING INPUTS

BACKGROUND

Machine learning processes are very useful for improving the efficiency of data management systems. Analytical models can be trained with machine learning processes to find hidden patterns within large amounts of data in such a way that useful information can be extracted from the data that would not otherwise be possible with human effort alone. Additionally, machine learning processes can help in a large variety of other computing tasks.

In many cases, data scientists have a large amount of unstructured and unlabeled data that they can only use for unsupervised learning. While unsupervised learning is very useful in many applications, many other powerful algorithms can be unlocked when supervised learning is an option. Typically, in order to make supervised learning an option, labeled training set data is needed for the supervised machine learning process.

However, generating labeled training set data can be a very lengthy and resource intensive exercise. Typically, data scientists must hand label each data item for the training set. Hand labeling each of a large number of data items for a training set is both difficult and time-consuming.

In some cases, the prospect of generating labeled training set data is so daunting that data scientists choose to forgo utilizing a supervised machine learning process. In cases in which the data scientists decide to generate labeled training set data, the process is resource intensive. The result is that supervised machine learning processes are underutilized because of the difficulty in generating labeled training sets for the supervised machine learning processes.

What is needed is a method and system that provides a technical solution to the technical problem of efficiently and accurately generating labeled training sets for supervised machine learning processes.

SUMMARY

Embodiments of the present disclosure provide one or more technical solutions to the technical problem of efficiently and accurately generating labeled training sets for supervised machine learning processes. Embodiments of the present disclosure provide a training set labeling system that receives, from a user, a data set including a plurality of data items to be labeled. The training set labeling system presents to the user, via a graphical user interface, successive sets of unlabeled data items for labeling by the user. After the user has labeled some of the data items, the training set labeling system analyzes the labeled data items and selects future unlabeled data items from the data set to be presented to the user based on analysis of the labeled data items. The training set labeling system selects data items to be presented in a manner that enables a labeled training set to be generated from the data set while minimizing the amount of input needed from the user. In this way, embodiments of the present disclosure enable users to quickly and efficiently generate training sets of labeled data items for machine learning processes.

In one embodiment, the training set labeling system includes an analysis model that learns to predict labels for unlabeled data items based on the data items that have been labeled so far by the user. The analysis model determines which unlabeled data items will be most useful to be labeled next by the user to add to the completeness of the training set, based on how confidently the analysis model can predict labels. In this way, the analysis model can reduce the number of unlabeled data items that need to be presented to the user to generate an effective training set. Additionally, or alternatively, the analysis model can present unlabeled data items to the user in a manner that enables the user to label the data items with fewer number of inputs required from the user.

Embodiments of the present disclosure overcome many of the drawbacks of traditional processes for generating labeled data sets for machine learning processes. Intelligently selecting and presenting unlabeled data items for labeling by the user utilizes significantly less memory and processing resources than having teams of data scientists labeling large numbers of data items by hand. The result is a training set generation process that is both efficient and effective in generating training sets for machine learning processes.

Figure 1:
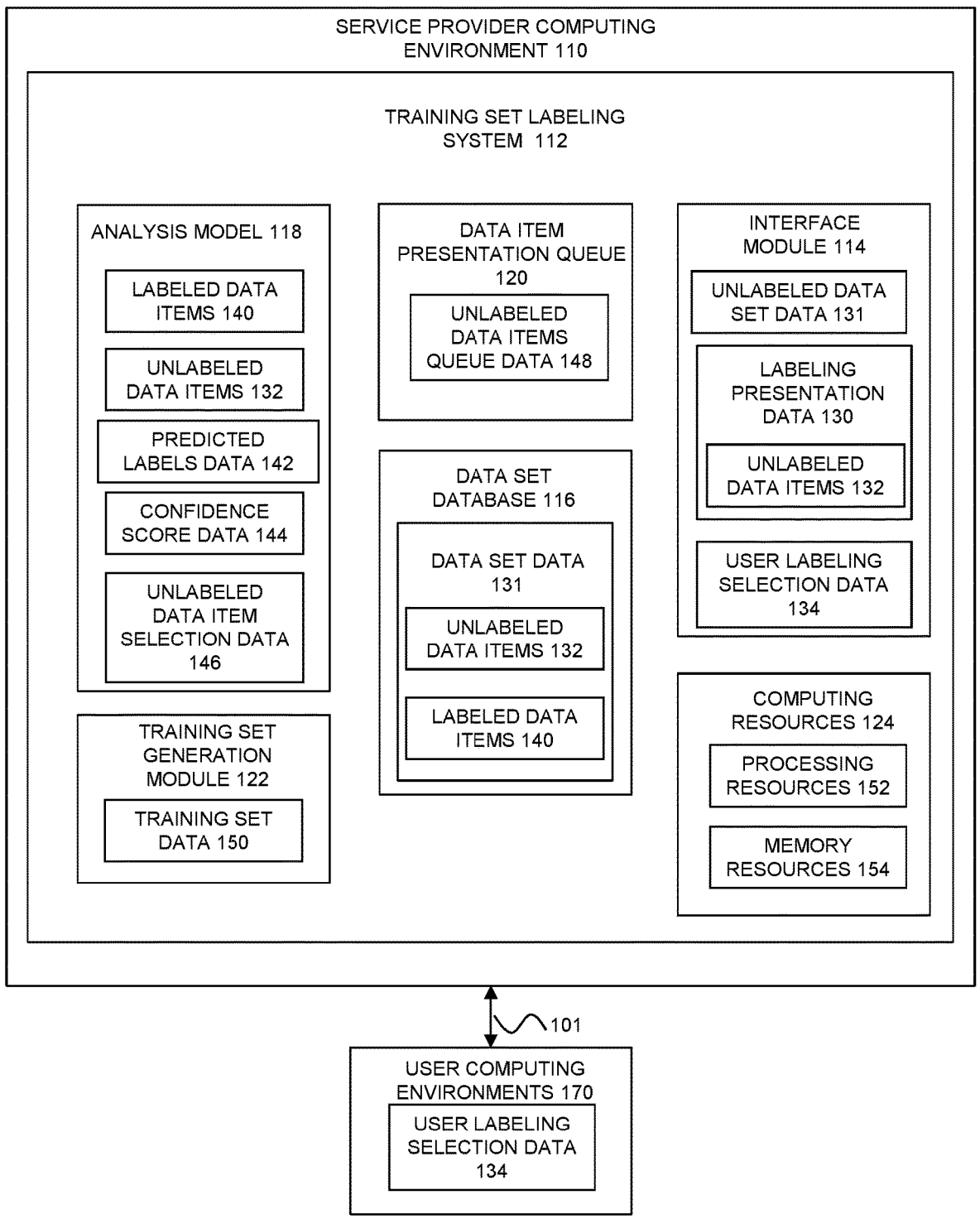
FIG. 1 is a block diagram of a system for efficiently generating training set data for machine learning processes, in accordance with one embodiment.

Common reference numerals are used throughout the FIGs and the detailed description to indicate like elements. One skilled in the art will readily recognize that the above FIGs are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs, which depict one or more exemplary embodiments. Embodiments may be implemented in many different forms and should not be construed as limited to the embodiments set forth herein, shown in the FIGs, and described below. Rather, these exemplary embodiments are provided to allow a complete disclosure that conveys the principles of the invention, as set forth in the claims, to those of skill in the art.

FIG. 1 illustrates a block diagram of a production environment 100 for efficiently generating training set data for machine learning processes, according to one embodiment. Embodiments of the present disclosure provide methods and systems for efficiently generating training set data for machine learning processes, according to one embodiment. Embodiments of the present disclosure receive, from a user, a data set including a plurality of unlabeled data items. Embodiments of the present disclosure present to the user one or more of the unlabeled data items and prompt the user to label the data items. After the user has labeled a number of the data items, embodiments of the present disclosure analyze, with an analysis model, the labeled data items in order to determine which unlabeled data items will be most effective to present to the user next for labeling in order to generate a complete and effective training set. Embodiments of the present disclosure continue presenting unlabeled data items, analyzing labeled data items, and selecting unlabeled data items to be presented next until training set completion criteria are met by which the training set is complete, and the labeling process is finished.

In one embodiment, the analysis model is trained, with a machine learning process, to learn to label the unlabeled data items based on analysis of the labeled data items. In this case, as the user provides labels for the data items that are presented to the user, the analysis model undergoes a machine learning process by which the analysis model learns to label the data items based on the data items that have been labeled so far by the user.

In one embodiment, while the user is labeling the data items that are presented, the analysis model generates predicted labeling data including predicted labels for the unlabeled data items. The analysis model can select unlabeled data items to be presented to the user based on the predicted labels. For example, the analysis model can generate, for each predicted label, a confidence score corresponding to a confidence that the predicted label is correct. The analysis model can select unlabeled data items to be presented to the user based on the confidence scores.

In one embodiment, the analysis model selects, for presentation to the user, unlabeled data items for which a predicted label has a confidence score lower than a threshold confidence score. In this way, rather than presenting data items for which the label can be predicted with a high degree of confidence based on the previous labels provided by the user, the analysis model selects for labeling by the user those data items for which the analysis model cannot confidently predict the label.

In one embodiment, selecting the unlabeled data items includes selecting data items for which a confidence score is in a selected range. For example, in some cases, a label can be predicted between two classes with only 50% confidence. Learning how the user would label such a data item can be very useful for training the analysis model. Accordingly, the analysis model can select for presentation to the user those data items whose label can only be predicted with between 40% and 60% confidence, for example.

In one embodiment, the training set completion criterium includes receiving an indication from the user that the labeling process is complete. For example, the user can provide input to the training set labeling system indicating that a sufficient number of data items have been labeled and that the labeling process is complete. In one embodiment, the training set labeling system can provide to the user an indication of the probability that the currently labeled data items are sufficiently representative of the data set as a whole such that a training set including those labeled data items would likely be effective for a machine learning process. When the probability reaches a level that satisfies the user, the user can end the labeling process. The training set labeling system can then provide the training set to the user including the labeled data items.

In one embodiment, the training set completion criterium includes reaching a probability threshold that the labeled data items are sufficient for the training set. In this case, the training set labeling system can determine that the labeling process is likely sufficient and can end the labeling process.

In one embodiment, the training set completion criterium includes labeling all data items from the data set. When all of the data items from the data set are labeled, the training set labeling system can determine that the labeling process is complete.

In one embodiment, presenting one or more unlabeled data items for labeling includes prompting the user to provide a label for the one or more unlabeled data items. The user can then provide a label, for example by typing a label into a data field. The user can also provide a label in other suitable ways.

In one embodiment, presenting one or more unlabeled data items for labeling includes providing multiple possible labels and prompting the user to select one of the provided labels. For example, in some cases, there is a finite number of possible labels. The possible labels can be presented to the user for selection so that the user does not need to type in or otherwise enter label by hand. Accordingly, receiving labeling selection data can include receiving a selection of one of the multiple possible labels.

In one embodiment, presenting one or more unlabeled data items for labeling includes providing a suggested label and prompting the user to confirm the selected label. If the suggested label is correct, then the user can merely approve or confirm the suggested label. If the suggested label is incorrect, the user can select or provide a different label.

In one embodiment, selecting unlabeled data items to be presented to the user includes selecting multiple unlabeled data items that likely will receive a same label based on analysis of the previously labeled data items. If the analysis model determines with a sufficiently high degree of confidence, that a certain number of data items are likely to receive a same particular label, the analysis model can select the multiple data items for presentation to the user simultaneously with the suggested label. The user can then approve or select the label for large number of data items simultaneously, thereby greatly reducing the number of inputs required by the user to label the data items.

The disclosed method and system for efficiently generating training set data for machine learning processes provide for the processing and storing of smaller amounts of data, i.e., by enabling the generation of labeled training sets with fewer actions and labels divided by the user; thereby eliminating unnecessary data analysis and storage. Consequently, using the disclosed method and system for efficiently generating training set data for machine learning processes results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for efficiently generating training set data for machine learning processes.

Referring to FIG. 1, the production environment 100 includes a service provider computing environment 110 for efficiently generating training set data for machine learning processes, according to one embodiment. The production environment 100 also includes user computing environments 170. The computing environments 110 and 170 are communicatively coupled to each other with one or more communication channels 101, according to various embodiments.

The service provider computing environment 110 represents one or more computing systems such as one or more servers or distribution centers that are configured to receive, execute, and host one or more training set labeling systems (e.g., applications) for access by one or more users, for efficiently generating training set data for machine learning processes, according to one embodiment. The service provider computing environment 110 can represent a traditional data center computing environment, a virtual asset computing environment (e.g., a cloud computing environment), a hybrid between a traditional data center computing environment and a virtual asset computing environment, or other kinds of computing environments, as discussed herein, known in the art, or as become known after the time of filing, according to one embodiment.

In one embodiment, the service provider computing environment 110 includes a training set labeling system 112. The training set labeling system 112 is configured to provide training set labeling services to a user. The training set labeling services enable users to quickly and efficiently generate training sets of labeled data items for supervised machine learning processes.

The training set labeling system 112 includes an interface module 114, a data set database 116, an analysis model 118, a data item presentation queue 120, a training set generation module 122, and computing resources 124, according to various embodiments.

The user computing environments 170 correspond to computing environments of the various users of the training set labeling system 112. The users of the training set labeling system 112 utilize the user computing environments 170 to interact with the training set labeling system 112. The users of the training set labeling system 112 can use the user computing environments 160 to provide data to the training set labeling system 112 and to receive data, including data management services, from the training set labeling system 112. The user computing environments 170 can include computing devices and systems utilized by users. The computing devices and systems can include desktop computers, laptop computers, tablets, smart phones, cloud-based virtual machines, servers, or other suitable computing devices and systems, according to various embodiments.

In one embodiment, the training set labeling system 112 utilizes the interface module 114 to enable users to interface with the training set labeling system 112. In particular, the interface module 114 is configured to communicate with the user computing environments 170. Users provide data from the user computing environments 170 to the training set labeling system 112 via the interface module 114. The training set labeling system 112 provides data to the user computing environments 170 via the interface module 114.

In one embodiment, the training set labeling system 112 includes a web accessed system into which users can login in order to receive services from the training set labeling system 112. For example, users may access the training set labeling system 112 by navigating to a uniform resource locator (URL) associated with the training set labeling system 112. In another example, users may access the training set labeling system 112 by activating a training set labeling application or program stored and executed in the user computing environments 170.

In one embodiment, the training set labeling system 112 provides a graphical user interface (GUI) to the user computing environments 170 via the interface module 114. The GUI can include data fields, icons, buttons, or other functionality by which the user can provide data to the training set labeling system 112 or make various selections that provide input, commands, or selections to the training set labeling system 112. The GUI can also include data fields, icons, buttons, text boxes, video players, or other features by which the GUI can present data to the user.

In one embodiment, the user can provide unlabeled data set data 131 to the training set labeling system 112. The unlabeled data set data 131 can include a large number of unlabeled data items from which the user would like to generate labeled training set data. The labeled training set data can then be used with a machine learning process to train a model for a desired purpose of the user.

In one example, in accordance with one embodiment, a user wishes to generate a training set to train a model to identify the merchants involved in financial transactions based on financial transaction description strings from in which the merchants are not named in a way that they can be reliably identified in a standard way. Accordingly, the user accesses the training set labeling system 112 and uploads an unlabeled data set including a plurality of financial transaction description strings. Each financial transaction description string is an unlabeled data item. In other words, the financial transaction description strings have not yet been labeled by the user. The user wishes to utilize the training set labeling system 112 to more efficiently label the financial transaction description strings. The training set labeling system 112 assists the user to label the financial transaction description strings with the merchants involved in the financial transactions.

In one embodiment, after the user has provided unlabeled data set data 131 to the training set labeling system 112, the user can also provide additional data related to possible labels. For example, the user may provide data indicating to the training set labeling system 112 that each data item will be relabeled as belonging to one of two classes. In another example, the user may provide data to the training set labeling system 112 indicating that each data item will be labeled with one of several possible labels. In yet another example, the user may provide data to the training set labeling system 112 indicating that each data item will be labeled with labels from an undefined set of labels.

In one embodiment, after the user has provided the unlabeled data set data 131 to the training set labeling system 112, the training set labeling system 112 stores the unlabeled data set data 131 and an unlabeled data set database 116. The unlabeled data set database 116 stores the unlabeled data set data 131 including the unlabeled data items 132. The training set labeling system 112 can retrieve unlabeled data items from the unlabeled data set database 116 for presentation to the user or for analysis by the analysis model 118, as will be set forth in more detail below.

In one embodiment, the unlabeled data set database 116 can store unlabeled data sets from various users of the training set labeling system 112. The training set labeling system 112 enables multiple users to access the training set labeling system services simultaneously. For example, multiple users can login to the training set labeling system 112 via the Internet, via an intranet, or via another kind of network. The data set database 116 can store unlabeled data sets for each user.

In one embodiment, after the user has uploaded the unlabeled data set data 131 and provided labeling parameters to the training set labeling system 112, the training set labeling system 112 begins to assist the user to label the unlabeled data items. The interface module 114 presents, via the GUI, labeling presentation data 130 to the user. The labeling presentation data 130 prompts the user to provide labels to one or more of the unlabeled data items. In response, the user can provide labels for the presented unlabeled data items. As will be set forth in more detail below after the user has labeled some of the data items, the training set labeling system 112 analyzes the labeled data items in order to intelligently assist the user to label remaining data items.

In one embodiment, the labeling presentation data 130 includes unlabeled data items 132. The user can view the unlabeled data items 132 and can provide user labeling selection data 134 to the training set labeling system 112. The user labeling selection data 134 indicates the labels that the user would like to provide to each unlabeled data item presented with the labeling presentation data 130. Thus, the user labeling selection data 134 applies labels to the data items presented with the labeling presentation data 130.

In one embodiment, the labeling presentation data 130 can include one data item at a time. When the user applies a label to the data item via the user labeling selection data 134, the interface module 114 provides labeling presentation data 130 including another unlabeled data item for the user to label. This process continues until labeling is complete based on selected criteria as will be set forth in more detail below.

In one embodiment, the labeling presentation data can include multiple data items at a time. Thus, the interface module 114 presents to the user multiple unlabeled data items simultaneously for the user to label. When the user has applied labels to each unlabeled data item in the labeling presentation data 130, the interface module 114 presents additional labeling presentation data 130 including multiple new unlabeled data items for the user to label. This process can continue until labeling is complete.

In one embodiment, the training set labeling system 112 utilizes an analysis model 118 to improve the efficiency of the labeling process. In particular, after the user has initially labeled some of the data items from the data set, the analysis model utilizes the labeled data items to improve the efficiency of the labeling process. The analysis model utilizes machine learning techniques to the next unlabeled data items to be presented to the user with the labeling presentation data 130 based on analysis of the already labeled data items.

In one embodiment, after the labeling process has begun and the user has labeled some of the data items, the analysis model analyzes labeled data items 140 corresponding to the data items that have been labeled already by the user. The analysis model 118 also analyzes the unlabeled data items 132 that have not yet been labeled. Based on analysis of the labeled data items 140 and the unlabeled data items 132, the analysis model 118 generates unlabeled data items selection data 146. The unlabeled data items selection data 146 includes one or more unlabeled data items to be added to a queue to be presented to the user with the labeling presentation data 130.

In one embodiment, the training set labeling system 112 utilizes the data item presentation queue 120 to line up unlabeled data items for presentation. The data item presentation queue 120 includes unlabeled data item queue data 148. The unlabeled data items queue data 148 includes a list of unlabeled data items that will be presented next to the user. The unlabeled data items at the front of the queue will be presented to the user next via the labeling presentation data 130. The analysis model 118 selects unlabeled data items for the unlabeled data items queue data 148 based on analysis of the labeled data items 140 and the unlabeled data items 132, and in accordance with one or more machine learning algorithms, in one embodiment.

In one embodiment, the analysis model 118 selects unlabeled data items for presentation in order to increase the efficiency of the labeling process. The analysis model 118 selects unlabeled data items in an effort to reduce the number of times that the user will need to provide input to label the data set. The analysis model 118 can work toward this end in a number of ways, as will be set forth in more detail below.

In one embodiment, the analysis model 118 utilizes one or more machine learning processes to learn to predict how the user would likely label unlabeled data items. For example, the analysis model 118 analyzes labeled data items 140 in order to learn what characteristics of the data items predict the label that was provided by the user. By learning to predict how the user would label data items, the analysis model 118 can greatly improve the efficiency of the labeling process. In one embodiment, the analysis model 118 learns to predict how the user would label unlabeled data items in order to reduce the number of inputs needed by the user to generate a satisfactory training set or to completely label the data set.

In one embodiment, the analysis model 118 generates predicted labels data 142 for the unlabeled data items 132. The predicted labels data 142 includes, for each unlabeled data item, a predicted label, based on analysis of the labeled data items 140. Alternatively, the analysis model generates predicted labels data 142 data for only a portion of the unlabeled data items 132. The analysis model uses the predicted labels data 142 to improve the efficiency of the labeling process.

In one embodiment, the analysis model generates confidence score data 144. The confidence score data 144 includes, for each predicted label and the predicted labels data 142, a confidence score in the accuracy of the predicted label. The higher the confidence score, the more confident the analysis model is that the predicted label would match the label that the user would apply. The lower the confidence score the less confident the analysis model 118 is that the predicted label with match the label that the user would apply. The analysis model 118 utilizes the confidence score data 144 to improve the efficiency of the labeling process for the user.

In one embodiment, the confidence score for a predicted label corresponds to a probability that the predicted label is correct. Accordingly, the confidence score can be called a probability or probability score. The probability score can be very useful in improving the efficiency of the labeling process for the user.

In one embodiment, the analysis model 118 can utilize the predicted labels data 142 and the confidence score data 144 to present a relatively large number of unlabeled data items simultaneously for easy labeling by the user. For example, based on analysis of the labeled data items 140 and the unlabeled data items 132, the analysis model 118 may identify a large number of data items that the analysis model is confident belong to a same label. In other words, the confidence score for each of these predicted labels passes a threshold confidence score. The interface module 114 presents labeling presentation data 130 to the user including the unlabeled data items for which the analysis model 118 has high confidence in their predicted labels. The interface module presents these data items and their predicted label to the user and asks the user to confirm whether all of these data items should be labeled with the predicted label. The user can briefly review the data items and can confirm that the data items all belong to the predicted label, or that one or more of the data items does not belong to the predicted label. If all of the data items belong to the predicted label, that the user is able to label a large number of data items simultaneously with a single click or a single selection input. This greatly reduces the amount of time that the user would need to spend labeling these data items under traditional schemes.

In one embodiment, if one or more of the presented unlabeled data items does not belong to the predicted label, then the user can quickly select which of the data items do not belong to the predicted label. The training set labeling system 112 can assign the labels to those data items not selected by the user. The training set labeling system can give an option to the user to label the data items. Alternatively, the analysis model 118 can withdraw the selected unlabeled data items and eventually predict new labels for the unlabeled data items selected by the user as not belonging to the predicted label. Advantageously, the analysis model 118 can utilize the machine learning process to improve the predictive abilities based on analysis of the items that the user confirmed belong to the predicted label and based on the items that the user conference did not belong to the predicted label.

In one embodiment, the analysis model 118 can utilize the predicted labels data 142 and the confidence score data 144 to reduce the number of data items that need to be labeled in order to generate a satisfactory training set from the data set. The analysis model 118 can improve the predictive powers of the analysis model 118 by intelligently selecting new unlabeled data items for presentation to the user. As the analysis model 118 selects unlabeled data items to be presented based on which data items would present the most benefit to the learning of the analysis model, the analysis model 118 can be able to predict when the user has labeled a sufficient number of the data items to represent a complete training set. When a sufficient number of the data items have been labeled to represent a complete training set for the machine learning process of the user, then the user can opt to cease further labeling. In this way, the analysis model 118 can greatly reduce the number of data items that need to be labeled.

In one embodiment, the analysis model 118 selects for labeling, those unlabeled data items for which the confidence score falls within a selected range. For example, the analysis model 118 can attempt to learn better how to label the edge cases. The edge cases correspond to those cases for which there is about a 50% confidence that the data item belongs to a particular label. Learning how the user would label these edge cases, can be most beneficial to the accuracy of the analysis model 118. Accordingly, in one embodiment, the analysis model 118 selects for the labeling presentation data 130, data items having a confidence score in the range around 50%. For example, the range can be between 40% and 60%.

In one embodiment, the analysis model 118 selects for labeling, those unlabeled data items for which the confidence score data is lowest. By selecting, for presentation to the user for labeling, unlabeled data items for which the confidence score is lowest, the analysis model 118 can greatly improve the ability to accurately predict labels. The more accurately that the analysis model 118 can predict labels, the more efficient the labeling process can be.

In one embodiment, the analysis model 118 supplies labels that will be utilized for the training set. In this case, after the user has labeled a number of the unlabeled data items, the analysis model 118 can accurately label many of the remaining unlabeled data items. Those data items that the analysis model 118 can label with a sufficiently high confidence score, can be moved to the labeled data items data 140. This eliminates the need for the user to label those data items.

In one embodiment, the training set labeling system 112 ends the labeling process based on a training set labeling completion criterium. When the completion criterium has been met, the training set labeling system 112 can end the labeling process in the training set labeling system 112 can generate a final training set data including the data items that have been labeled by the user.

In one embodiment, the training set completion criterium includes receiving an indication from the user that the labeling process is complete. For example, the user can provide input to the training set labeling system 112 indicating that a sufficient number of data items have been labeled and that the labeling process is complete. In one embodiment, the analysis model 118 can provide to the user, via the interface module 114, an indication of the probability that the current labeled data items are sufficiently representative of the data set as a whole such that a training set including those labeled data items would likely be effective for a machine learning process. When the probability reaches a level that satisfies the user, the user can end the labeling process. The training set labeling system can then provide the training set to the user, including the labeled data items.

In one embodiment, the training set completion criterium includes reaching a probability threshold that the labeled data items are sufficient for the training set. In this case, the analysis model 118 can determine that the labeling process is likely sufficient and can end the labeling process.

In one embodiment, the training set completion criterium includes labeling all data items from the data set. When all of the data items from the data set are labeled, the training set labeling system can determine that the labeling process is complete.

In one embodiment, the training set labeling system 112 utilizes the training set generation module 122 to generate training set data 150. After the completion criterium has been met and the labeling process is complete, the training set generation module 122 generates training set data 150 including all of the labeled data items. The interface module 114 outputs the training set data 150 to the user. The user can then utilize the training set data 150 for supervised machine learning processes, or for other purposes of the user.

The training set labeling system 112 greatly reduces the amount of time and effort required by the user to label unlabeled data items for a training set, according to various embodiments. The training set labeling system 112 can reduce the number of inputs required by the user to label a large number of data items. The training set labeling system 112 can eliminate the need altogether to label many of the data items. The training set labeling system can produce the speed with which data items can be presented to the user for labeling. All of these benefits, and others set forth herein, greatly increase the efficiency of the labeling process. This enables users to spend more time developing their own machine learning models with supervised machine learning processes and less time to labeling data sets.

In one embodiment, the training set labeling system 112 includes computing resources 124. The computing resources 124 include processing resources 152 and memory resources 154. The processing resources 152 include one or more processors. The memory resources 154 include one or more memories configured as computer readable media capable of storing software instructions and other data. The processing resources 152 are capable of executing software instructions stored on the computer readable media. In one embodiment, the various components, modules, databases, and engines of the training set labeling system 112 utilize the computing resources 124 to assist in performing their various functions. Alternatively, or additionally, the various components, modules, databases, and engines can utilize other computing resources.

In one embodiment, the training set labeling system 112 is implemented, at least partially, within the user computing environments 170. For example, the user computing environments 170 can store a software application or program that implements the training set labeling system 112. Thus, the user can open the application, provide the unlabeled data set data 131 to the application, and the application can commence the labeling process as set forth above. Alternatively, portions of the training set labeling system 112 can be implemented in the user computing environments 170, while other portions are implemented in the service provider computing environments 110.

In one embodiment, the training set labeling system 112 is a simple, customizable, and scalable framework for gathering labels in the cloud accessible through the web or application programming interface (API).

In one embodiment, training set labeling system 112 builds a distribution of the data of the labeled data items as the user labels them. The analysis model 118 can then update and estimate the remaining labels, significantly reducing the number of overall labels needed to a supervised learning method.

In one embodiment, the training set labeling system 112 includes a framework library. The framework library can be written in a programming language such as Python, or another programming language. The skeleton of the framework can be a web-based micro framework application rendering simple HTML with an open source front-end web framework, for example. The application can be deployed to a cloud computing platform as a serverless function. The framework library can utilize a cloud-based queue and a cloud-based nonrelational database to store labels.

In one embodiment, once the user installs the package, they can initialize an instance of the framework which will copy over the framework skeleton into the project. The skeleton is a basic application using web-based micro framework as a backend and an open source front-end web framework for the frontend. With the help of an open source library, this application is easily deployed onto a cloud-based platform as a serverless function. The labeling framework also creates a cloud-based queue and a cloud-based database instance in the cloud-based platform. A user can upload data to the cloud-based queue, which then gets represented in the user interface for the application. After a user submits a label, the label gets stored in the cloud-based database instance. The user then will use the library to send the data to get labeled to the deployed instance. The library creates messages to put on the cloud-based queue to be ingested by the application. Once the labeling is done, the library has a function to ingest the data from the cloud-based database instance. The data can then be used for supervised learning. In one embodiment, one step is that while some of the data is labeled and the rest is not, the data can be fit to a distribution. Using this distribution, the data points that are not labeled can be estimated. This can make the overall process of labeling much more efficient.

Embodiments of the present disclosure overcome many of the drawbacks of traditional processes for generating labeled data sets for machine learning processes. Intelligently selecting and presenting unlabeled data items for labeling by the user utilizes significantly less memory and processing resources than having teams of data scientists labeling large numbers of data items by hand. The result is a training set generation process that is both efficient and effective in generating training sets for machine learning processes.

Figure 2:
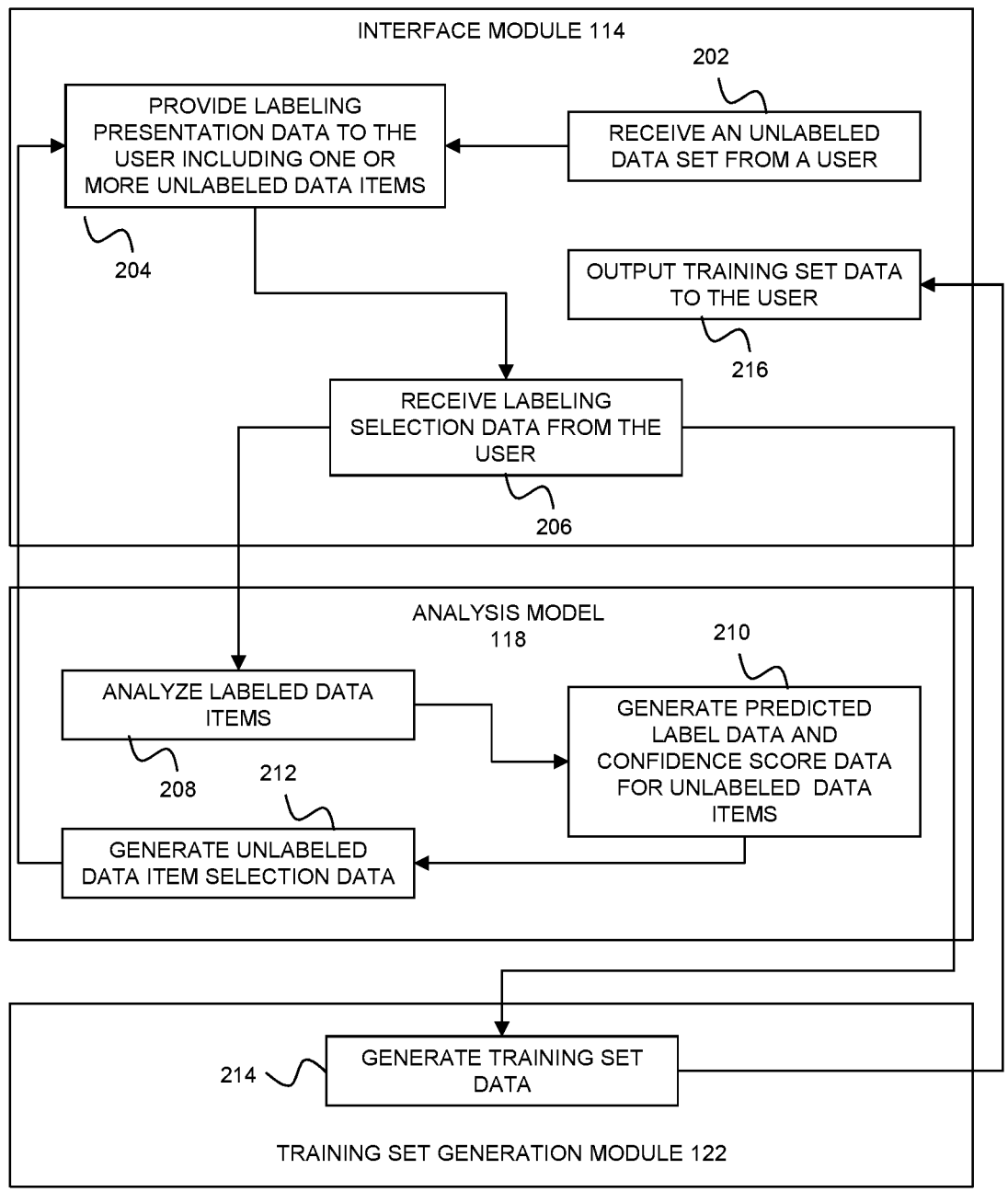
FIG. 2 is a functional flow diagram of a process for efficiently generating training set data for machine learning processes, in accordance with one embodiment.

FIG. 2 illustrates a functional flow diagram of a process 200 for efficiently generating training set data for machine learning processes, in accordance with various embodiments.

Referring to FIGS. 1-2, and the descriptions of FIGS. 1-2 above, at block 202, the interface module 114 receives an unlabeled data set from the user, using any of the methods, processes, and procedures discussed above with respect to FIGS. 1-2, according to one embodiment. From block 202 the process proceeds to block 204.

At block 204, the interface module 114 provides labeling presentation data to the user including one or more unlabeled data items to be labeled by the user, using any of the methods, processes, and procedures discussed above with respect to FIGS. 1-2, according to one embodiment. From block 204 the process proceeds to block 206.

At block 206, the interface module 114 receives labeling selection data from the user, using any of the methods, processes, and procedures discussed above with respect to FIGS. 1-2, according to one embodiment. From block 206 the process proceeds to block 208.

At block 208, the analysis model 118 analyzes labeled data items that were labeled by the user, using any of the methods, processes, and procedures discussed above with respect to FIGS. 1-2, according to one embodiment. From block 208 the process proceeds to block 210.

At block 210, the analysis model 118 generates predicted label data and confidence score data for unlabeled data items, using any of the methods, processes, and procedures discussed above with respect to FIGS. 1-2, according to one embodiment. From block 210 the process proceeds to block 212.

At block 212, the analysis model 118 generates unlabeled data item selection data including one or more unlabeled data items to be presented to the user based on the predicted label data and the confidence score data, using any of the methods, processes, and procedures discussed above with respect to FIGS. 1-2, according to one embodiment. From block 212 process steps 204, 206, 208, and 210 are repeated until all of the unlabeled data has been labeled, or until other completion criteria are met. If all of the unlabeled data has been labeled, or other completion criteria are met, then from block 206, the process proceeds to block 214.

At block 214 the training set generation module 122 generates training set data, using any of the methods, processes, and procedures discussed above with respect to FIGS. 1-2, according to one embodiment. The training set data includes all of the labeled data items. From block 214 the process proceeds to block 216.

At block 216 the interface module 114 outputs the training set data to the user, using any of the methods, processes, and procedures discussed above with respect to FIGS. 1-2, according to one embodiment. From block 216 the process proceeds to block 218.

Those of skill in the art will recognize, in light of the present disclosure, that the process 200 can include different steps, different orders of steps, and steps performed by modules other than those represented in FIG. 2. All such other processes fall within the scope of the present disclosure.

Figure 3:
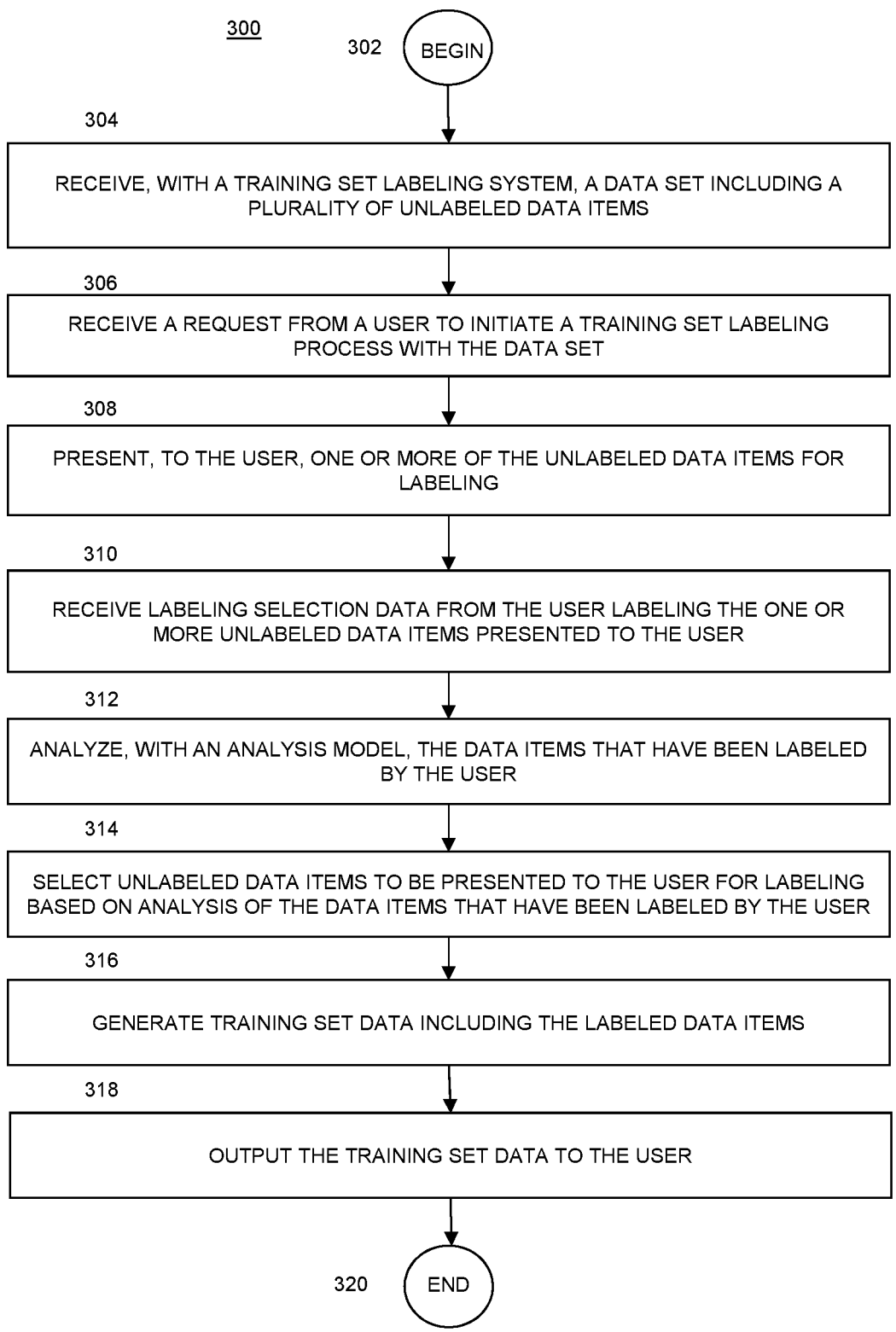
FIG. 3 is a flow diagram of a process for efficiently generating training set data for machine learning processes, in accordance with one embodiment.

FIG. 3 illustrates a flow diagram of a process 300 for efficiently generating training set data for machine learning processes, in various embodiments.

Referring to FIGS. 1-3, and the description of FIGS. 1-2 above, in one embodiment, process 300 begins at BEGIN 302 and process flow proceeds to RECEIVE, WITH A TRAINING SET LABELING SYSTEM, A DATA SET INCLUDING A PLURALITY OF UNLABELED DATA ITEMS 304.

In one embodiment, at RECEIVE, WITH A TRAINING SET LABELING SYSTEM, A DATA SET INCLUDING A PLURALITY OF UNLABELED DATA ITEMS 304, a data set is received, with a training set labeling system, including a plurality of unlabeled data items, using any of the methods, processes, and procedures discussed above with respect to FIGS. 1-2

In one embodiment, once a data set is received, with a training set labeling system, including a plurality of unlabeled data items at RECEIVE, WITH A TRAINING SET LABELING SYSTEM, A DATA SET INCLUDING A PLURALITY OF UNLABELED DATA ITEMS 304 process flow proceeds to RECEIVE A REQUEST FROM A USER TO INITIATE A TRAINING SET LABELING PROCESS WITH THE DATA SET 306.

In one embodiment, at RECEIVE A REQUEST FROM A USER TO INITIATE A TRAINING SET LABELING PROCESS WITH THE DATA SET 306, a request is received from a user to initiate a training set labeling process with the data set, using any of the methods, processes, and procedures discussed above with respect to FIGS. 1-2

In one embodiment, once a request is received from a user to initiate a training set labeling process with the data set at RECEIVE A REQUEST FROM A USER TO INITIATE A TRAINING SET LABELING PROCESS WITH THE DATA SET 306, process flow proceeds to PRESENT, TO THE USER, ONE OR MORE OF THE UNLABELED DATA ITEMS FOR LABELING 308.

In one embodiment, at PRESENT, TO THE USER, ONE OR MORE OF THE UNLABELED DATA ITEMS FOR LABELING 308, one or more of the unlabeled data items are presented to the user for labeling, using any of the methods, processes, and procedures discussed above with respect to FIGS. 1-2

In one embodiment, once one or more of the unlabeled data items are presented to the user for labeling at PRESENT, TO THE USER, ONE OR MORE OF THE UNLABELED DATA ITEMS FOR LABELING 308, process flow proceeds to RECEIVE LABELING SELECTION DATA FROM THE USER LABELING THE ONE OR MORE UNLABELED DATA ITEMS PRESENTED TO THE USER 310.

In one embodiment, at RECEIVE LABELING SELECTION DATA FROM THE USER LABELING THE ONE OR MORE UNLABELED DATA ITEMS PRESENTED TO THE USER 310, labeling selection data is received from the user labeling the one or more unlabeled data items presented to the user, using any of the methods, processes, and procedures discussed above with respect to FIGS. 1-2

In one embodiment, once labeling selection data is received from the user labeling the one or more unlabeled data items presented to the user at RECEIVE LABELING SELECTION DATA FROM THE USER LABELING THE ONE OR MORE UNLABELED DATA ITEMS PRESENTED TO THE USER 310, process flow proceeds to ANALYZE, WITH AN ANALYSIS MODEL, THE DATA ITEMS THAT HAVE BEEN LABELED BY THE USER 312.

In one embodiment, at ANALYZE, WITH AN ANALYSIS MODEL, THE DATA ITEMS THAT HAVE BEEN LABELED BY THE USER 312, the data items that have been labeled by the user are analyzed with an analysis model, using any of the methods, processes, and procedures discussed above with respect to FIGS. 1-2

In one embodiment, once the data items that have been labeled by the user are analyzed with an analysis model, at ANALYZE, WITH AN ANALYSIS MODEL, THE DATA ITEMS THAT HAVE BEEN LABELED BY THE USER 312, process flow proceeds to SELECT UNLABELED DATA ITEMS TO BE PRESENTED TO THE USER FOR LABELING BASED ON ANALYSIS OF THE DATA ITEMS THAT HAVE BEEN LABELED BY THE USER 314.

In one embodiment, at SELECT UNLABELED DATA ITEMS TO BE PRESENTED TO THE USER FOR LABELING BASED ON ANALYSIS OF THE DATA ITEMS THAT HAVE BEEN LABELED BY THE USER 314, unlabeled data items are selected to be presented to the user for labeling based on analysis of the data items that have been labeled by the user, using any of the methods, processes, and procedures discussed above with respect to FIGS. 1-2

In one embodiment, once unlabeled data items are selected to be presented to the user for labeling based on analysis of the data items that have been labeled by the user at SELECT UNLABELED DATA ITEMS TO BE PRESENTED TO THE USER FOR LABELING BASED ON ANALYSIS OF THE DATA ITEMS THAT HAVE BEEN LABELED BY THE USER 314, process flow proceeds to GENERATE TRAINING SET DATA INCLUDING THE LABELED DATA ITEMS 316.

In one embodiment, at GENERATE TRAINING SET DATA INCLUDING THE LABELED DATA ITEMS, training set data is generated including the labeled data items, using any of the methods, processes, and procedures discussed above with respect to FIGS. 1-2

In one embodiment, once training set data is generated including the labeled data items at GENERATE TRAINING SET DATA INCLUDING THE LABELED DATA ITEMS 316, process flow proceeds to OUTPUT THE TRAINING SET DATA TO THE USER 318.

In one embodiment, at OUTPUT THE TRAINING SET DATA TO THE USER 318, the training set data is output to the user, using any of the methods, processes, and procedures discussed above with respect to FIGS. 1-2

In one embodiment, once the training set data is output to the user at OUTPUT THE TRAINING SET DATA TO THE USER 318, process flow proceeds to END 320.

In one embodiment, at END 320 the process 300 for efficiently generating training set data for machine learning processes is exited to await new data and/or instructions.

Figure 4:
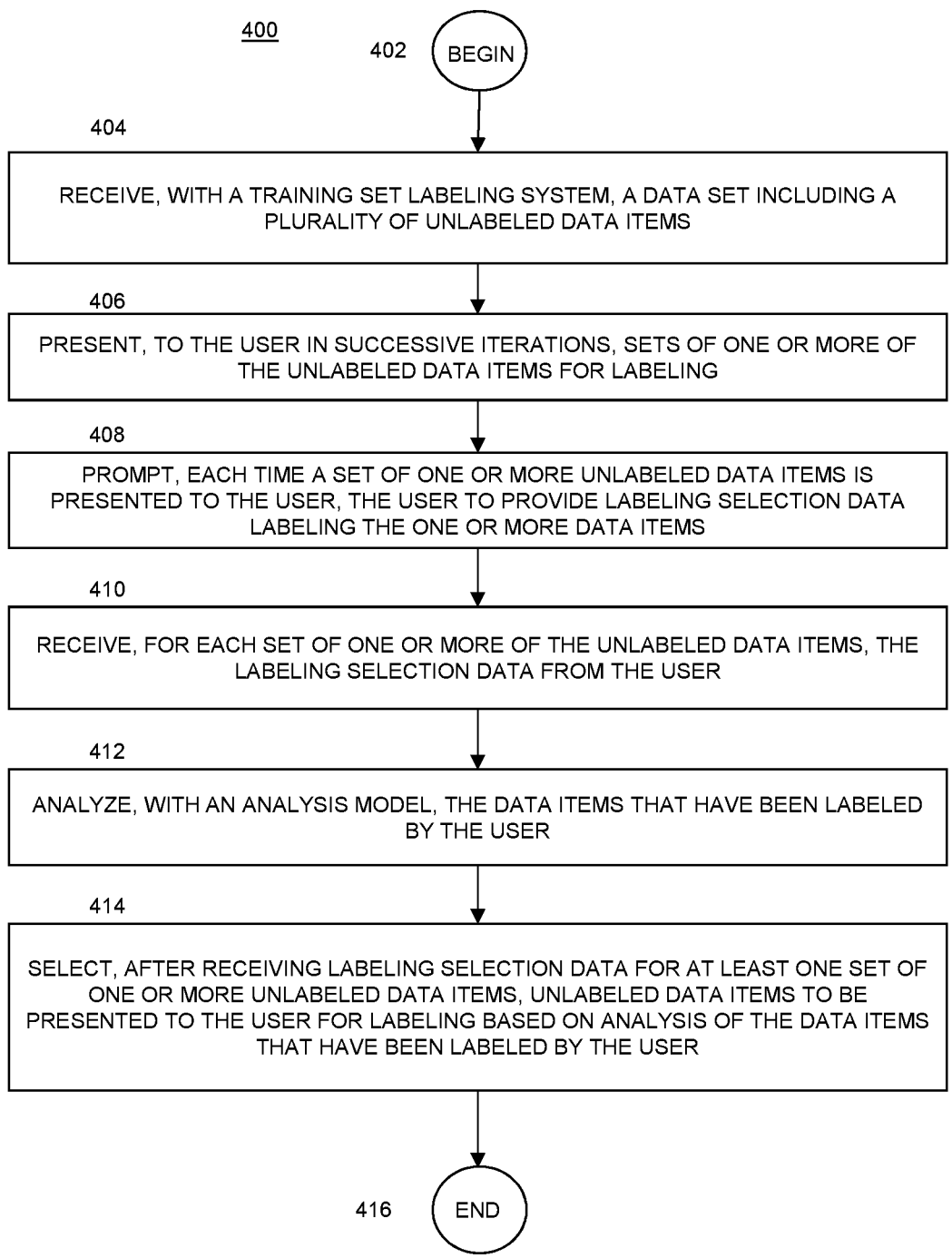
FIG. 4 is a flow diagram of a process for efficiently generating training set data for machine learning processes, in accordance with one embodiment.

FIG. 4 illustrates a flow diagram of a process 400 for efficiently generating training set data for machine learning processes, in various embodiments.

Referring to FIG. 4, FIGS. 1-2, and the description of FIGS. 1-2 above, in one embodiment, process 400 begins at BEGIN 402 and process flow proceeds to RECEIVE, WITH A TRAINING SET LABELING SYSTEM, A DATA SET INCLUDING A PLURALITY OF UNLABELED DATA ITEMS 404.

In one embodiment, at RECEIVE, WITH A TRAINING SET LABELING SYSTEM, A DATA SET INCLUDING A PLURALITY OF UNLABELED DATA ITEMS 404, a data set is received, with a training set labeling system, including a plurality of unlabeled data items, using any of the methods, processes, and procedures discussed above with respect to FIGS. 1-2

In one embodiment, once a data set is received, with a training set labeling system, including a plurality of unlabeled data items at RECEIVE, WITH A TRAINING SET LABELING SYSTEM, A DATA SET INCLUDING A PLU- RALITY OF UNLABELED DATA ITEMS 404 process flow proceeds to PRESENT, TO THE USER IN SUCCESSIVE ITERATIONS, SETS OF ONE OR MORE OF THE UNLABELED DATA ITEMS FOR LABELING 406.

In one embodiment, at PRESENT, TO THE USER IN SUCCESSIVE ITERATIONS, SETS OF ONE OR MORE OF THE UNLABELED DATA ITEMS FOR LABELING 406, sets of one or more of the unlabeled data items for labeling are presented to the user in successive iterations, sets of one or more of the unlabeled data items for labeling, using any of the methods, processes, and procedures discussed above with respect to FIGS. 1-2.

In one embodiment, once sets of one or more of the unlabeled data items for labeling are presented to the user in successive iterations, sets of one or more of the unlabeled data items for labeling at PRESENT, TO THE USER IN SUCCESSIVE ITERATIONS, SETS OF ONE OR MORE OF THE UNLABELED DATA ITEMS FOR LABELING 406, process flow proceeds to PROMPT, EACH TIME A SET OF ONE OR MORE UNLABELED DATA ITEMS IS PRESENTED TO THE USER, THE USER TO PROVIDE LABELING SELECTION DATA LABELING THE ONE OR MORE DATA ITEMS 408.

In one embodiment, at PROMPT, EACH TIME A SET OF ONE OR MORE UNLABELED DATA ITEMS IS PRESENTED TO THE USER, THE USER TO PROVIDE LABELING SELECTION DATA LABELING THE ONE OR MORE DATA ITEMS 408, the user is prompted, each time a set of one or more unlabeled data items is presented to the user, to provide labeling selection data labeling the one or more data items, using any of the methods, processes, and procedures discussed above with respect to FIGS. 1-2

In one embodiment, once the user is prompted, each time a set of one or more unlabeled data items is presented to the user, to provide labeling selection data labeling the one or more data items at PROMPT, EACH TIME A SET OF ONE OR MORE UNLABELED DATA ITEMS IS PRESENTED TO THE USER, THE USER TO PROVIDE LABELING SELECTION DATA LABELING THE ONE OR MORE DATA ITEMS 408, process flow proceeds to RECEIVE, FOR EACH SET OF ONE OR MORE OF THE UNLABELED DATA ITEMS, THE LABELING SELECTION DATA FROM THE USER 410.

In one embodiment, at RECEIVE, FOR EACH SET OF ONE OR MORE OF THE UNLABELED DATA ITEMS, THE LABELING SELECTION DATA FROM THE USER 410, the labeling selection data is received from the user for each set of one or more of the unlabeled data items, using any of the methods, processes, and procedures discussed above with respect to FIGS. 1-2

In one embodiment, once the labeling selection data is received from the user for each set of one or more of the unlabeled data items, at RECEIVE, FOR EACH SET OF ONE OR MORE OF THE UNLABELED DATA ITEMS, THE LABELING SELECTION DATA FROM THE USER 410, process flow proceeds to ANALYZE, WITH AN ANALYSIS MODEL, THE DATA ITEMS THAT HAVE BEEN LABELED BY THE USER 412.

In one embodiment, at ANALYZE, WITH AN ANALYSIS MODEL, THE DATA ITEMS THAT HAVE BEEN LABELED BY THE USER 412, the data items that have been labeled by the user are analyzed with an analysis model, using any of the methods, processes, and procedures discussed above with respect to FIGS. 1-2

In one embodiment, once the data items that have been labeled by the user are analyzed with an analysis model at ANALYZE, WITH AN ANALYSIS MODEL, THE DATA ITEMS THAT HAVE BEEN LABELED BY THE USER 412, process flow proceeds to SELECT, AFTER RECEIVING LABELING SELECTION DATA FOR AT LEAST ONE SET OF ONE OR MORE UNLABELED DATA ITEMS, UNLABELED DATA ITEMS TO BE PRESENTED TO THE USER FOR LABELING BASED ON ANALYSIS OF THE DATA ITEMS THAT HAVE BEEN LABELED BY THE USER 414.

In one embodiment, at SELECT, AFTER RECEIVING LABELING SELECTION DATA FOR AT LEAST ONE SET OF ONE OR MORE UNLABELED DATA ITEMS, UNLABELED DATA ITEMS TO BE PRESENTED TO THE USER FOR LABELING BASED ON ANALYSIS OF THE DATA ITEMS THAT HAVE BEEN LABELED BY THE USER 414, unlabeled data items are selected, after receiving labeling selection data for at least one set of one or more unlabeled data items, to be presented to the user for labeling based on analysis of the data items that have been labeled by the user, using any of the methods, processes, and procedures discussed above with respect to FIGS. 1-2

In one embodiment, once unlabeled data items are selected, after receiving labeling selection data for at least one set of one or more unlabeled data items, to be presented to the user for labeling based on analysis of the data items that have been labeled by the user at SELECT, AFTER RECEIVING LABELING SELECTION DATA FOR AT LEAST ONE SET OF ONE OR MORE UNLABELED DATA ITEMS, UNLABELED DATA ITEMS TO BE PRESENTED TO THE USER FOR LABELING BASED ON ANALYSIS OF THE DATA ITEMS THAT HAVE BEEN LABELED BY THE USER 414 process flow proceeds to END 416.

In one embodiment, at END 416 the process 400 for efficiently generating training set data for machine learning processes is exited to await new data and/or instructions.

As noted, the specific illustrative examples discussed above are but illustrative examples of implementations of embodiments of the method or process for efficiently generating training set data for machine learning processes. Those of skill in the art will readily recognize that other implementations and embodiments are possible. Therefore, the discussion above should not be construed as a limitation on the claims provided below.

One embodiment is a method for efficiently generating training set data for machine learning processes. The method includes receiving, with a training set labeling system, a data set including a plurality of unlabeled data items, receiving a request from a user to initiate a training set labeling process with the data set, and presenting, to the user, one or more of the unlabeled data items for labeling. The method includes receiving labeling selection data from the user labeling the one or more unlabeled data items presented to the user and analyzing, with an analysis model, the data items that have been labeled by the user. The method includes selecting unlabeled data items to be presented to the user for labeling based on analysis of the data items that have been labeled by the user, generating training set data including the labeled data items, and outputting the training set data to the user.

In one embodiment, a system for efficiently generating training set data for machine learning processes includes at least one processor and at least one memory coupled to the at least one processor. The at least one memory having stored therein instructions which, when executed by any set of the one or more processors, perform a process. The process includes receiving, with a training set labeling system, a data set including a plurality of unlabeled data items, receiving a request from a user to initiate a training set labeling process with the data set, and presenting, to the user, one or more of the unlabeled data items for labeling. The process includes receiving labeling selection data from the user labeling the one or more unlabeled data items presented to the user and analyzing, with an analysis model, the data items that have been labeled by the user. The process includes selecting unlabeled data items to be presented to the user for labeling based on analysis of the data items that have been labeled by the user, generating training set data including the labeled data items, and outputting the training set data to the user.

One embodiment is a method for efficiently generating training set data for machine learning processes. The method includes receiving, with a training set labeling system, a data set including a plurality of unlabeled data items and presenting, to the user in successive iterations, sets of one or more of the unlabeled data items for labeling. The method includes prompting, each time a set of one or more unlabeled data items is presented to the user, the user to provide labeling selection data labeling the one or more data items and receiving, for each set of one or more of the unlabeled data items, the labeling selection data from the user. The method includes analyzing, with an analysis model, the data items that have been labeled by the user and selecting, after receiving labeling selection data for at least one set of one or more unlabeled data items, unlabeled data items to be presented to the user for labeling based on analysis of the data items that have been labeled by the user.

In one embodiment, a system for efficiently generating training set data for machine learning processes includes at least one processor and at least one memory coupled to the at least one processor. The at least one memory having stored therein instructions which, when executed by any set of the one or more processors, perform a process. The process includes receiving, with a training set labeling system, a data set including a plurality of unlabeled data items and presenting, to the user in successive iterations, sets of one or more of the unlabeled data items for labeling. The process includes prompting, each time a set of one or more unlabeled data items is presented to the user, the user to provide labeling selection data labeling the one or more data items and receiving, for each set of one or more of the unlabeled data items, the labeling selection data from the user. The process includes analyzing, with an analysis model, the data items that have been labeled by the user and selecting, after receiving labeling selection data for at least one set of one or more unlabeled data items, unlabeled data items to be presented to the user for labeling based on analysis of the data items that have been labeled by the user.

Herein, the term "production environment" includes the various components, or assets, used to deploy, implement, access, and use, a given application as that application is intended to be used. In various embodiments, production environments include multiple assets that are combined, communicatively coupled, virtually connected, physically connected, or otherwise associated with one another, to provide the production environment implementing the application.

As specific illustrative examples, the assets making up a given production environment can include, but are not limited to, one or more computing environments used to implement the application in the production environment such as one or more of a data center, a cloud computing environment, a dedicated hosting environment, and other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control one or more assets or components of the production environment; one or more communications channels for sending and receiving data used to implement the application in the production environment; one or more access control systems for limiting access to various components of the production environment, such as firewalls and gateways; one or more traffic or routing systems used to direct, control, or buffer, data traffic to components of the production environment, such as routers and switches; one or more communications endpoint proxy systems used to buffer, process, or direct data traffic, such as load balancers or buffers; one or more secure communication protocols or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; or any other assets/components making up an actual production environment in which an application is deployed, implemented, accessed, and run, e.g., operated, as discussed herein, or as known in the art at the time of filing, or as developed after the time of filing.

As used herein, the term "historical user data" refers to data that has been stripped of all data, such as Personal Identification Data (PID), that could identify any individual. Accordingly, the historical user data is data that has been sanitized by removing any data that could be used to identify any individual user, directly or indirectly, or that could be used to access a historical user's data or accounts, or otherwise reveal personal information about a specific individual. Furthermore, historical user data is used only for testing document preparation systems, such as testing tax return preparation systems.

As used herein, the terms "computing system", "computing device", and "computing entity", include, but are not limited to, a virtual asset; a server computing system; a workstation; a desktop computing system; a mobile computing system, including, but not limited to, smart phones, portable devices, or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes or operations as described herein.

As used herein, the term "computing environment" includes, but is not limited to, a logical or physical grouping of connected or networked computing systems or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems or virtual assets making up the trusted computing environment, are either under the control of, or known to, a party.

In various embodiments, each computing environment includes allocated assets and virtual assets associated with, and controlled or used to create, deploy, or operate an application.

In various embodiments, one or more cloud computing environments are used to create, deploy, or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, or as known in the art at the time of filing, or as developed after the time of filing.

In many cases, a given application or service may utilize, and interface with, multiple cloud computing environments, such as multiple VPCs, in the course of being created, deployed, or operated.

As used herein, the term "virtual asset" includes any virtualized entity or resource or virtualized part of an actual "bare metal" entity. In various embodiments, the virtual assets can be, but are not limited to, virtual machines, virtual servers, and instances implemented in a cloud computing environment; databases associated with a cloud computing environment, or implemented in a cloud computing environment; services associated with, or delivered through, a cloud computing environment; communications systems used with, part of, or provided through, a cloud computing environment; or any other virtualized assets or sub-systems of "bare metal" physical devices such as mobile devices, remote sensors, laptops, desktops, point-of-sale devices, etc., located within a data center, within a cloud computing environment, or any other physical or logical location, as discussed herein, or as known/available in the art at the time of filing, or as developed/made available after the time of filing.

In various embodiments, any, or all, of the assets making up a given production environment discussed herein, or as known in the art at the time of filing, or as developed after the time of filing, can be implemented as one or more virtual assets.

In one embodiment, two or more assets, such as computing systems or virtual assets, two or more computing environments, are connected by one or more communications channels including but not limited to, Secure Sockets Layer communications channels and various other secure communications channels, or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, or virtual assets, as discussed herein, or available or known at the time of filing, or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, or computing systems, whether available or known at the time of filing or as later developed.

As used herein, the term "user" includes, but is not limited to, any party, parties, entity, or entities using, or otherwise interacting with any of the methods or systems discussed herein. For instance, in various embodiments, a user can be, but is not limited to, a person, a commercial entity, an application, a service, or a computing system.

As used herein, the term "relationship(s)" includes, but is not limited to, a logical, mathematical, statistical, or other association between one set or group of information, data, or users and another set or group of information, data, or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed training set labeling system determines a relationship between a first group of data and a second group of data, then a characteristic or subset of a first group of data can be related to, associated with, or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

Embodiments of the present disclosure address some of the shortcomings associated with traditional processes for labeling data items. A training set labeling system in accordance with one or more embodiments provides sample test sets that are very small in size and that nevertheless provide for accurate testing because they cover virtually the entire range of historical users. The various embodiments of the disclosure can be implemented to improve the technical fields of data processing, data management, data transmission, data analysis, and data collection. Therefore, the various described embodiments of the disclosure and their associated benefits amount to significantly more than an abstract idea.

Using the disclosed embodiments of a method and system for efficiently generating training set data for machine learning processes, a method and system for efficiently generating training set data for machine learning processes more accurately is provided. Therefore, the disclosed embodiments provide a technical solution to the long-standing technical problem of accurately and efficiently labeling data items for a machine learning training set.

The result is a much more accurate, adaptable, and robust method and system for efficiently generating training set data for machine learning processes. This, in turn, results in: less human and processor resources being dedicated to slow and tedious processes of labeling data items because more accurate and efficient analysis methods can be implemented, i.e., less time required for analysis by humans, usage of fewer processing resources, usage of fewer memory storage assets, and less communication bandwidth being utilized to transmit data for analysis.

The disclosed method and system for efficiently generating training set data for machine learning processes does not encompass, embody, or preclude other forms of innovation in the area of training set labeling systems. In addition, the disclosed method and system for efficiently generating training set data for machine learning processes is not related to any fundamental economic practice, fundamental data processing practice, mental steps, or pen and paper-based solutions, and is, in fact, directed to providing solutions to new and existing problems associated with machine learning processes. Consequently, the disclosed method and system for efficiently generating training set data for machine learning processes, does not encompass, and is not merely, an abstract idea or concept.

In the discussion above, certain aspects of one embodiment include process steps, operations, or instructions described herein for illustrative purposes in a particular order or grouping. However, the particular orders or groupings shown and discussed herein are illustrative only and not limiting. Those of skill in the art will recognize that other orders or groupings of the process steps, operations, and instructions are possible and, in some embodiments, one or more of the process steps, operations and instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

As discussed in more detail above, using the above embodiments, with little or no modification or input, there is considerable flexibility, adaptability, and opportunity for customization to meet the specific needs of various parties under numerous circumstances.

In the discussion above, certain aspects of one embodiment include process steps, operations, or instructions described herein for illustrative purposes in a particular order or grouping. However, the particular order or grouping shown and discussed herein are illustrative only and not limiting. Those of skill in the art will recognize that other orders and groupings of the process steps, operations, or instructions are possible and, in some embodiments, one or more of the process steps, operations, or instructions discussed above can be combined or deleted. In addition, portions of one or more of the process steps, operations, or instructions can be re-grouped as portions of one or more other of the process steps, operations, or instructions discussed herein. Consequently, the particular order or grouping of the process steps, operations, or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or another device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method for generating labeled training set data for a machine learning process, the method performed by one or more processors of a labeling system and comprising:
   receiving, from a system user, unlabeled data including a set of unlabeled data items;
   receiving, from the system user, a request to initiate a training set labeling process on the unlabeled data;
   prompting the system user to manually label a first subset of the unlabeled data items;
   receiving first labeled data from the system user, the first labeled data including a manually entered label for each unlabeled data item of the first subset of unlabeled data items;
   analyzing the first labeled data with an analysis model;
   identifying one or more characteristics of the first labeled data based on the analysis, each respective characteristic of the one or more characteristics predictive of how the system user would label an unlabeled data item having the respective characteristic;
   training the analysis model to predict how the system user will label a given unlabeled data item based on the one or more characteristics;
   generating, using the trained analysis model, a prediction of how the system user will label the remaining unlabeled data items and a set of confidence values each indicative of a probability that the associated prediction is correct;
   determining, based on the confidence values, which of the remaining unlabeled data items, if labeled by the system user, have a highest probability of increasing an accuracy of the analysis model;
   selecting, from the remaining unlabeled data items, a second subset of unlabeled data items to be presented to the system user for labeling based on the determining;
   prompting the system user to manually label the second subset of unlabeled data items;
   receiving second labeled data from the system user, the second labeled data including a manually entered label for each unlabeled data item of the second subset of unlabeled data items;
   determining that a training set completion criteria associated with the unlabeled data is met based on an analysis of the second labeled data;
   generating, using the trained analysis model, labels for each remaining unlabeled data item among the set of unlabeled data items;
   generating, using the trained analysis model, labeled training set data including a label for each remaining unlabeled data item among the set of unlabeled data items; and
   outputting the labeled training set data to the system user.

2. The method of claim 1, wherein determining that the training set completion criteria is met includes:
   receiving an indication from the system user that the manual labeling is complete.

3. The method of claim 1, wherein determining that the training set completion criteria is met includes:
   determining a probability that the manual labeling is sufficient for meeting the training set completion criteria; and
   determining that the probability is greater than a probability threshold.

4. The method of claim 1, wherein determining that the training set completion criteria is met includes:
   determining that each unlabeled data item of the set of unlabeled data items is labeled.

5. The method of claim 1, wherein prompting the system user to manually label the second subset of unlabeled data items includes:
   providing the system user with multiple possible labels; and
   prompting the system user to select one of the multiple possible labels.

6. The method of claim 5, further comprising:
   receiving a selection of one of the multiple possible labels.

7. The method of claim 1, wherein prompting the system user to manually label the second subset of unlabeled data items includes:
   providing a suggested label; and
   prompting the user to confirm whether the suggested label is accurate.

8. The method of claim 1, wherein selecting the second subset of unlabeled data items includes:
   identifying, using the trained analysis model, one or more data items among the set of unlabeled data items that have a relatively high likelihood of being assigned a same label by the system user.

9. The method of claim 1, wherein selecting the second subset of unlabeled data items includes:
   generating, for each respective data item of the remaining unlabeled data items, a predicted label; and
   generating, for each predicted label, a confidence score indicating a likelihood that the predicted label is correct.

10. The method of claim 9, further comprising:
selecting ones of the predicted labels having a confidence score less than a value.

11. The method of claim 9, further comprising:
selecting ones of the predicted labels having a confidence score within a specified range.

12. The method of claim 1, wherein prompting the system user to manually label the second subset of unlabeled data items includes:
presenting one or more data items of the second subset of unlabeled data items to the system user via a graphical user interface, wherein the second labeled data is received from the system user via the graphical user interface.

13. A system for generating labeled training set data for a machine learning process, the system comprising:
one or more processors; and
at least one memory coupled to the one or more processors and storing instructions that, when executed by the one or more processors, cause the system to perform operations including:
receiving, from a system user, unlabeled data including a set of unlabeled data items;
receiving, from the system user, a request to initiate a training set labeling process on the unlabeled data;
prompting the system user to manually label a first subset of the unlabeled data items;
receiving first labeled data from the system user, the first labeled data including a manually entered label for each unlabeled data item of the first subset of unlabeled data items;
analyzing the first labeled data with an analysis model;
identifying one or more characteristics of the first labeled data based on the analysis, each respective characteristic of the one or more characteristics predictive of how the system user would label an unlabeled data item having the respective characteristic;
training the analysis model to predict how the system user will label a given unlabeled data item based on the one or more characteristics;
generating, using the trained analysis model, a prediction of how the system user will label the remaining unlabeled data items and a set of confidence values each indicative of a probability that the associated prediction is correct;
determining, based on the confidence values, which of the remaining unlabeled data items, if labeled by the system user, have a highest probability of increasing an accuracy of the analysis model;
selecting, from the remaining unlabeled data items, a second subset of unlabeled data items to be presented to the system user for labeling based on the determining;
prompting the system user to manually label the second subset of unlabeled data items;
receiving second labeled data from the system user, the second labeled data including a manually entered label for each unlabeled data item of the second subset of unlabeled data items;
training the analysis model to predict how the system user will label a given unlabeled data item based on an analysis of one or more characteristics of the second labeled data;
determining that a training set completion criteria associated with the unlabeled data is met;
generating, using the trained analysis model, labels for each remaining unlabeled data item among the set of unlabeled data items;
generating, using the trained analysis model, labeled training set data including a label for each remaining unlabeled data item among the set of unlabeled data items; and
outputting the labeled training set data to the system user.

14. The system of claim 13, wherein determining that the training set completion criteria is met includes:
receiving an indication from the system user that the manual labeling is complete.

15. The system of claim 13, wherein determining that the training set completion criteria is met includes:
determining a probability that the manual labeling is sufficient for meeting the training set completion criteria; and
determining that the probability is greater than a probability threshold.

16. The system of claim 13, wherein determining that the training set completion criteria is met includes:
determining that each unlabeled data item of the set of unlabeled data items is labeled.

17. The system of claim 13, wherein prompting the system user to manually label the second subset of unlabeled data items includes:
providing the system user with multiple possible labels; and
prompting the system user to select one of the multiple possible labels.

18. The system of claim 17, wherein execution of the instructions causes the system to perform operations further including:
receiving a selection of one of the multiple possible labels.

19. The system of claim 13, wherein prompting the system user to manually label the second subset of unlabeled data items includes:
providing a suggested label; and
prompting the user to confirm whether the suggested label is accurate.

20. The system of claim 13, wherein selecting the second subset of unlabeled data items includes:
identifying, using the trained analysis model, one or more data items among the set of unlabeled data items that have a relatively high likelihood of being assigned a same label by the system user.

21. The system of claim 13, wherein selecting the second subset of unlabeled data items includes:
generating, for each respective data item of the remaining unlabeled data items, a predicted label; and
generating, for each predicted label, a confidence score indicating a likelihood that the predicted label is correct.

22. The system of claim 21, wherein execution of the instructions causes the system to perform operations further including:
selecting ones of the predicted labels having a confidence score less than a value.

23. The system of claim 21, wherein execution of the instructions causes the system to perform operations further including:
selecting ones of the predicted labels having a confidence score within a specified range.

24. The system of claim 13, wherein prompting the system user to manually label the second subset of unlabeled data items includes:
    presenting one or more data items of the second subset of unlabeled data items to the system user via a graphical user interface, wherein the second labeled data is received from the system user via the graphical user interface.

25. A non-transitory computer-readable medium storing instructions that, when executed by one or more processors of a system, cause the system to perform operations including:
    receiving, from a system user, unlabeled data including a set of unlabeled data items;
    receiving, from the system user, a request to initiate a training set labeling process on the unlabeled data;
    prompting the system user to manually label a first subset of the unlabeled data items;
    receiving first labeled data from the system user, the first labeled data including a manually entered label for each unlabeled data item of the first subset of unlabeled data items;
    analyzing the first labeled data with an analysis model;
    identifying one or more characteristics of the first labeled data based on the analysis, each respective characteristic of the one or more characteristics predictive of how the system user would label an unlabeled data item having the respective characteristic;
    training the analysis model to predict how the system user will label a given unlabeled data item based on the one or more characteristics;
    generating, using the trained analysis model, a prediction of how the system user will label the remaining unlabeled data items and a set of confidence values each indicative of a probability that the associated prediction is correct;
    determining, based on the confidence values, which of the remaining unlabeled data items, if labeled by the system user, have a highest probability of increasing an accuracy of the analysis model;
    selecting, from the remaining unlabeled data items, a second subset of unlabeled data items to be presented to the system user for labeling based on the determining;
    prompting the system user to manually label the second subset of unlabeled data items;
    receiving second labeled data from the system user, the second labeled data including a manually entered label for each unlabeled data item of the second subset of unlabeled data items;
    training the analysis model to predict how the system user will label a given unlabeled data item based on an analysis of one or more characteristics of the second labeled data;
    determining that a training set completion criteria associated with the unlabeled data is met;
    generating, using the trained analysis model, labels for each remaining unlabeled data item among the set of unlabeled data items;
    generating, using the trained analysis model, labeled training set data including a label for each remaining unlabeled data item among the set of unlabeled data items; and
    outputting the labeled training set data to the system user.

26. The computer-readable medium of claim 25, wherein determining that the training set completion criteria is met includes:
    receiving an indication from the system user that the manual labeling is complete.

27. The computer-readable medium of claim 25, wherein determining that the training set completion criteria is met includes:
    determining a probability that the manual labeling is sufficient for meeting the training set completion criteria; and
    determining that the probability is greater than a probability threshold.

28. The computer-readable medium of claim 25, wherein determining that the training set completion criteria is met includes:
    determining that each unlabeled data item of the set of unlabeled data items is labeled.

29. The computer-readable medium of claim 25, wherein prompting the system user to manually label the second subset of unlabeled data items includes:
    providing the system user with multiple possible labels; and
    prompting the system user to select one of the multiple possible labels.

\* \* \* \* \*